United States Patent
Kusano

(10) Patent No.: US 8,710,774 B2
(45) Date of Patent: Apr. 29, 2014

(54) ELECTRIC TRAIN DRIVE CONTROL DEVICE

(75) Inventor: Kenichi Kusano, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 13 days.

(21) Appl. No.: 13/508,692

(22) PCT Filed: Dec. 18, 2009

(86) PCT No.: PCT/JP2009/007005
§ 371 (c)(1),
(2), (4) Date: May 8, 2012

(87) PCT Pub. No.: WO2011/074045
PCT Pub. Date: Jun. 23, 2011

(65) Prior Publication Data
US 2012/0227616 A1      Sep. 13, 2012

(51) Int. Cl.
*H02P 3/14* (2006.01)
(52) U.S. Cl.
USPC ....... 318/376; 318/400.25; 318/374; 318/375
(58) Field of Classification Search
USPC .............................. 318/374, 375, 376, 400.26
See application file for complete search history.

(56) References Cited

U.S. PATENT DOCUMENTS

| | | | |
|---|---|---|---|
| 5,839,800 A * | 11/1998 | Koga et al. | 303/152 |
| 7,673,949 B2 * | 3/2010 | Kuramochi et al. | 303/122.03 |
| 2007/0141874 A1 * | 6/2007 | Steigerwald et al. | 439/110 |
| 2007/0272904 A1 * | 11/2007 | Johnston et al. | 254/2 R |
| 2007/0284196 A1 * | 12/2007 | Sakai et al. | 187/305 |
| 2008/0093916 A1 | 4/2008 | Negoro | |

FOREIGN PATENT DOCUMENTS

| | | |
|---|---|---|
| JP | 60-109701 A | 6/1985 |
| JP | 2-146903 A | 6/1990 |
| JP | 6-090503 A | 3/1994 |
| JP | 2003-230202 A | 8/2003 |
| JP | A-2006-246700 | 9/2006 |
| JP | 2009-189198 A | 8/2009 |
| WO | 2007/032073 A1 | 3/2007 |

OTHER PUBLICATIONS

International Search Report (PCT/ISA/210) issued on Mar. 23, 2010, by the Japanese Patent Office as the International Searching Authority for International Application No. PCT/JP2009/007005.
Sep. 25, 2013 Korean Office Action issued in Korean Patent Application No. 10-2012-7012404.

* cited by examiner

*Primary Examiner* — Eduardo Colon Santana
*Assistant Examiner* — Bickey Dhakal
(74) *Attorney, Agent, or Firm* — Buchanan Ingersoll & Rooney PC

(57) ABSTRACT

A drive control device for an electric train comprises a switch for connecting or opening direct-current power, a power converter into which the direct-current power is input via the switch between two terminals on an input side and which converts the direct-current power into alternating-current power through a switching action and drives an alternating current rotating machine connected on an output side, and a voltage detector for detecting the voltage between the two terminals. In addition, a power controller is provided that controls the power converter such that when the detected voltage of the voltage detector exceeds a predetermined open-circuit voltage, the switch is opened and the regenerative brake force is reduced by the alternating current rotating machine under a predetermined reduction pattern having a ramp reduction time longer than 0.

12 Claims, 5 Drawing Sheets

ELECTRIC TRAIN DRIVE CONTROL DEVICE

TECHNICAL FIELD

The present invention relates to a drive control device supplied for propulsion control in an electric train.

BACKGROUND ART

In general, electric trains are composed such that power from overhead lines is received by a collector, this received power is used to drive an alternating current rotating machine by means of a drive control device that uses an inverter circuit and/or the like, thereby causing the electric train to run. In addition, when a brake is applied to the electric train, a so-called regenerative brake is used that obtains braking power by regenerative operation of the alternating current rotating machine. The regenerative power generated at this time is supplied via the overhead lines or a third rail to other energized trains near this train or the load of this train's cars, and is thereby consumed.

However, during the early morning and/or at nighttime, and/or on quiet lines with few trains in operation, there are times when other trains are not present near this train, and in such cases the regenerative load is insufficient, so the regenerative power generated by regenerative braking cannot be adequately consumed. When the regenerative electric power of this train is larger than the electric power consumed by other trains, the overhead line voltage rises, creating concerns that various equipment connected to the overhead lines could be tripped and/or damaged by the overvoltage.

Accordingly, some inverter circuits provided in electric trains have a voltage detection unit for detecting the overhead line voltage and/or the like (the overhead line voltage or the filter capacitor voltage of the input side of the inverter circuits, for example, corresponding to the overhead line voltage), and in addition, have a primary circuit composition in which an overvoltage control resistance and a switching device that are part of an overvoltage control unit are connected on the input side of the inverter circuits, so that if the overvoltage occurs, exceeding a predetermined value, operation of the inverter circuits are suspended by opening a switch connecting to the overhead lines which results in discharging the electric charge in the filter capacitor with the switching device of the overvoltage control unit as a continuous conduction condition, thereby protecting equipment from overvoltage (for example, see Patent Literature 1).

PRIOR ART LITERATURE

Patent Literature

Patent Literature 1: Unexamined Japanese Patent Application KOKAI Publication No. 2009-189198 (see pages 3-5, FIG. 2).

DISCLOSURE OF INVENTION

Problems to be Solved by the Invention

The operation of a system with this kind of primary circuit composition is explained below with reference to FIG. 5. When the overhead voltage (EFC) exceeds a predetermined open-circuit voltage (V3) due to a lack of a regenerative load, the operation of the inverter circuit (INV) is promptly stopped (OFF), and simultaneously with the line breaker (LB) detaching from the overhead lines as open (OFF), the switching device (SW) of the overvoltage control unit assumes a continuous conducting condition (ON) and the electric charge in the filter capacitor is discharged. The regenerative brake force (BT) operates until the overhead line voltage exceeds a control value, but when this control value is exceeded, operation of the inverter circuit (INV) stops, so the electric current (IM) of the alternating current rotating machine and the regenerative braking power (BT) are lost instantaneously.

The electric train uses the regenerative brake with priority and has a structure such that when regenerative braking is insufficient for brake commands from the driver's console, this insufficiency is calculated and a mechanical brake force (BM) supplements the insufficient regenerative braking. However, the mechanical brake obtains braking power through friction by causing a brake shoe to be pressed again a wheel and/or the like under air pressure, so time is required until the mechanical brake operates sufficiently. In normal operation of the electric train, when regenerative braking is turned off and a transition to mechanical braking is made, the regenerative braking force is gradually diminished and during this time the mechanical braking force is gradually increased, and through this it is possible to keep the braking force of the electric train nearly constant, but when the regenerative braking force is lost instantaneously as described above, during the time until the mechanical braking acts the total braking force (Btotal) of the electric train is insufficient, giving rise to a phenomenon in which deceleration drops precipitously. In such cases, the problem arises that the riding comfort in the cars deteriorates due to the change in deceleration and the braking distance is extended.

In order to resolve the above problems, the present invention provides a drive control device for an electric train that can improve the riding comfort and minimize changes in deceleration in an electric train, even in cases in which the regenerative load is insufficient during regenerative braking operation.

Means for Solving the Problem

The drive control device for an electric train according to the present invention has a switch for connecting or opening direct-current electric power; a power converter into which the direct-current electric power is input via the switch between two terminals on an input side, for converting the direct-current electric power into alternating-current electric power through a switching operation, and driving an alternating-current rotating machine connected to an output side; and a voltage detector for detecting voltage between the two terminals.

In addition, the drive control device has a power controller for controlling the power converter such that when the voltage detected by the voltage detector exceeds a predetermined open-circuit voltage, the switch opens and regenerative brake power is reduced by the alternating-current rotating machine in a predetermined reduction pattern having a ramp reduction time longer than zero.

Effect of the Invention

With the drive control device for an electric train according to the present invention, a power controller controls an electric power converter so as to reduce regenerative braking force through an alternating current rotating machine in a predetermined reduction pattern having a ramp reduction period longer than 0 when the voltage detected by the voltage detection unit exceeds a predetermined open-circuit voltage, so because it is possible for braking power by a mechanical brake to increase during this reduction period, it is possible to minimize changes in deceleration of the electric train and improve riding comfort even in cases in which the regenerative load is insufficient during regenerative braking.

BEST MODE FOR CARRYING OUT THE INVENTION

Embodiment 1

Figure 1:
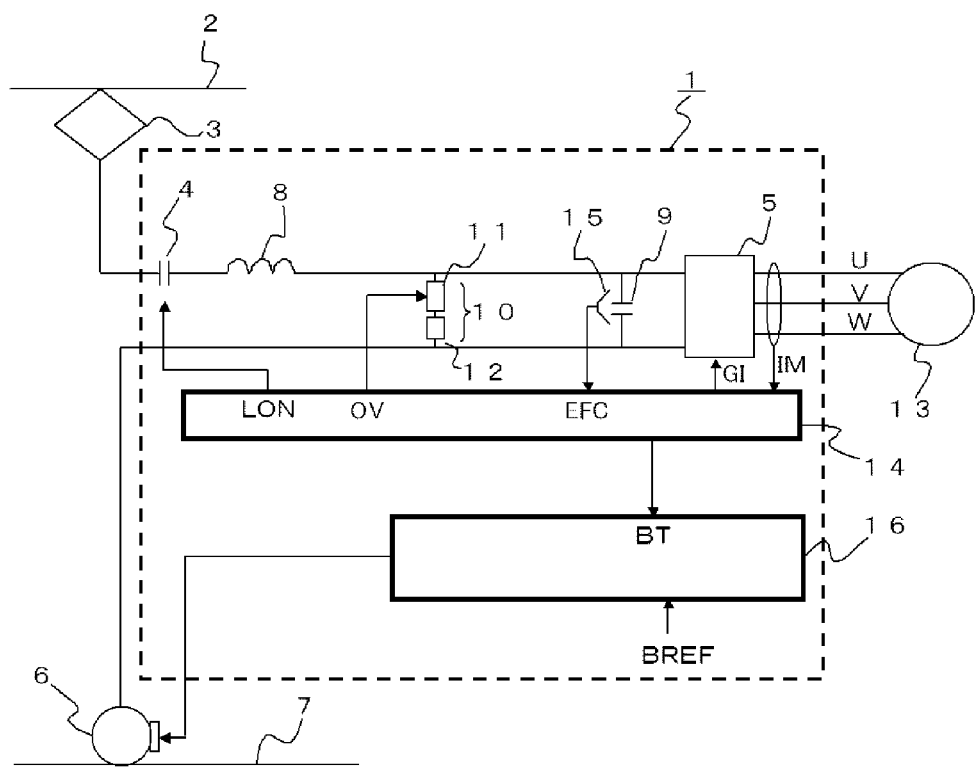
FIG. 1 shows an example of the composition of a drive control device for an electric train according to a first embodiment of the present invention.

FIG. 1 shows an example of the composition of a drive control device 1 for an electric train according to a first embodiment of the present invention. As shown in FIG. 1, direct-current electric power from an unrepresented transformer substation is input to the drive control device 1 by a collector 3 connecting to overhead lines 2. The direct-current electric power is input to an inverter circuit 5 that is a power converter, via a line breaker 4 that is a switch for opening or connecting this direct-current power. Return current from the drive control device 1 flows to a rail 7 via wheels 6, and returns to the negative side of the unrepresented transformer substation.

The drive control device 1 comprises an input filter that comprises a reactor 8 and a filter capacitor 9 and a capacitor voltage regulator 10 that is provided for protecting the inverter circuit 5 when the input voltage increases abnormally due to a lack of regenerative load during a regenerative braking action, and at the same time maintains the voltage at which the inverter circuit 5 operates even when the line breaker 4 is opened when the input voltage increases, and this capacitor voltage regulator 10 is composed of a switching device 11 connected to the rear part of the reactor 8 and a discharge resistor 12.

In addition, as an inverter circuit 5 that is a power converter, a voltage-type PWM inverter circuit is suitable, but this circuit composition is commonly known so detailed explanation is omitted here. The inverter circuit 5 converts direct-current power to alternating-current power through a switching action, and drives an alternating current rotating machine 13 connected on the output side. In addition, the combination of the inverter circuit 5 and the alternating current rotating machine 13 can also be used as a regenerative brake that brakes the electric train, by the alternating current rotating machine 13 acting as a generator and kinetic energy being converted to electric energy and recovered.

A power controller 14 is provided in the drive control device 1, into which at least a detected voltage EFC output from a voltage detector 15 that is impressed on the filter capacitor 9, and an electric current IM of the alternating current rotating machine 13 are input, and from which a control signal LON for the line breaker 4, a control signal OV for the switching device 11, a control signal GI for the switching device inside the inverter circuit 5, and a regenerative brake power signal indicating the regenerative force BT for a brake controller 16 are output. Here, the voltage EFC impressed on the filter capacitor 9 is equivalent to the voltage between input terminals of the inverter circuit 5. In addition, the regenerative brake power signal indicates the output state of the alternating current rotating machine 13 in the period when a regenerative brake is operates. The method of generating the control signal OV for the switching device 11 and the control signal GI for the switching device inside the inverter circuit 5 is explained in detail below.

When the regenerative brake force BT is insufficient compared to a brake force command signal BREF from an unrepresented external driver's console, the brake controller 16 calculates the insufficient brake force, using the brake force command signal BREF from the driver's console and the regenerative brake force signal from the power controller 14, and causes mechanical braking force to act on the train wheels 6 through a mechanical brake. Because the mechanical brake operates using air pressure, in general time is needed for the change in air pressure to be conveyed inside the air pipes for braking power to sufficiently increase. This time varies depending on the length of the air pipes and such factors, but is normally from 200 milliseconds to 2 seconds.

Figure 2:
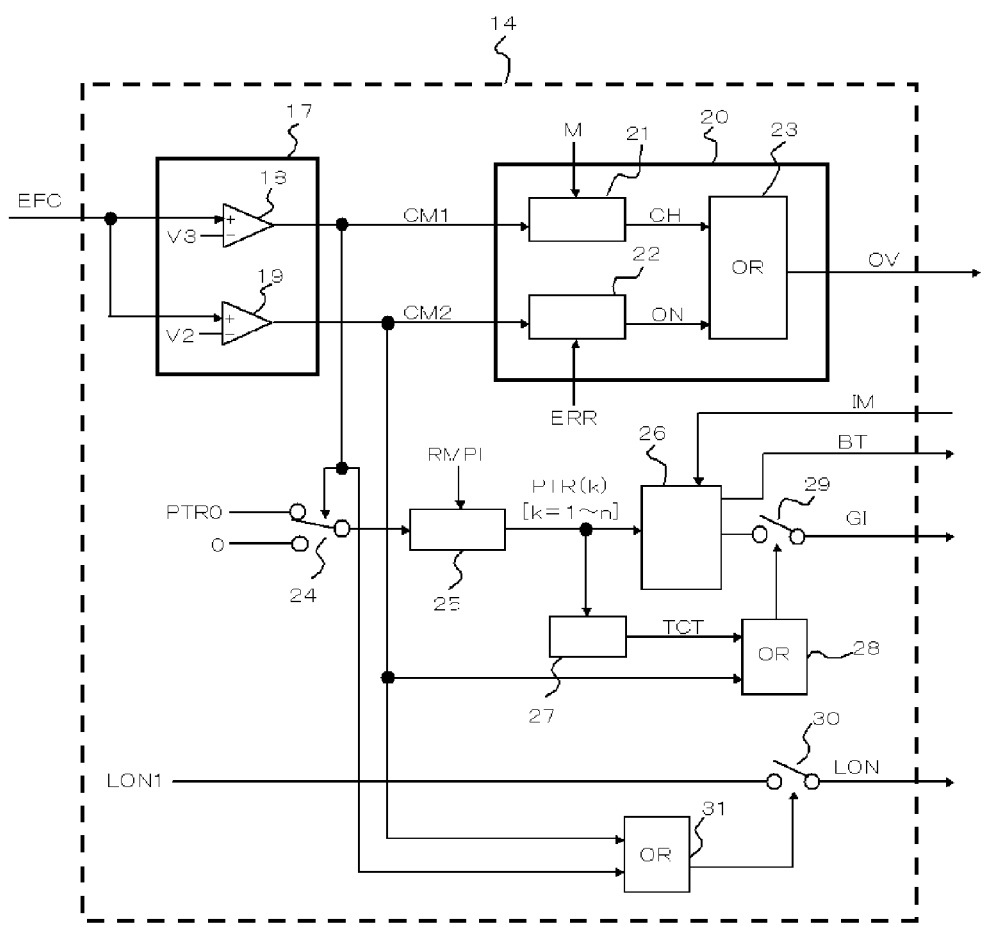
FIG. 2 shows an example of the power controller in a drive control device for an electric train according to a first embodiment of the present invention.

Next, the composition of the power controller 14, which is a unique characteristic of the present invention, is described in detail. FIG. 2 shows an example of the composition of the power controller 14 in a drive control device 1 for an electric train according to this embodiment. First, the composition relating to regulating the voltage EFC impressed on the filter capacitor 9 in this power controller 14, that is to say the voltage impressed between the input-side terminals of the inverter circuit 5, will be described. As shown in FIG. 2, the detected voltage EFC detected by the voltage detector 15 is input to a voltage determiner 17 of the power controller 14. The voltage determiner 17 is composed of a first comparator 18 and a second comparator 19.

A characteristic voltage will be defined for the drive control device 1 for an electric train according to this embodiment. The power controller 14 controls the switching device 11 of the capacitor voltage regulator 10 so that the detected voltage EFC is not less than a first voltage (V1) and not greater than a second voltage (V2). Here, as V1, it is possible to use the operating lower limit voltage on which the inverter circuit 5 that is a power converter operates, and as V2, it is possible to use the maximum used voltage of this inverter circuit 5. The operating lower limit voltage and the maximum used voltage are voltages predetermined by the inverter circuit 5 used, but as the inverter circuit 5 used in an electric railway in which the nominal voltage of the overhead lines 2 is DC 1500 V, it is possible to operate with a lower limit voltage of 900 V in a typical example and to operate with a maximum used voltage of 1900 V.

In addition, as will be explained in detail below, at the time when the regenerative braking action has been completed, all of the electric charge is not discharged but a certain fixed amount of electric charge remains in the filter capacitor 9, but at this time the charge voltage is taken to be a third voltage V3 (maintenance voltage). It is necessary for V3 to be greater than the first voltage V1 (operating lower limit voltage of the inverter circuit 5) and less than the second voltage V2 (maximum used voltage), and this is set with a voltage target at which the performance of regenerative braking can be maintained, and for example can be 1800 V. In this embodiment, the third voltage V3 may also be used as an open-circuit voltage for opening the line breaker 4, but naturally this open-circuit voltage may be determined separately from the third voltage V3.

The detected voltage EFC from the voltage detector 15 is input into the first comparator 18 and is compared to the third voltage V3. If EFC>V3, an output signal CM1 is set to a high level (first state). Simultaneously, the detected voltage EFC is input into the second comparator 19 and is compared to the second voltage V2. If EFC>V2, an output signal CM2 is set to a high level (second state).

The signals CM1 and CM2 are input into a switching device control signal generator 20. The switching device control signal generator 20 generates an on/off control signal OV for intermittently controlling the switching device 11 of the capacitor voltage regulator 10, and is composed of a CH control device 21, an ON control device 22 and an OR circuit 23. The CMI1 signal from the first comparator 18 and a conduction ratio M are input into the CH control device 21 of the switching device control signal generator 20, and a CH signal is output. In addition, the CM2 signal from the second comparator 19 and an error signal ERR are input into the ON control device 22, and an ON signal is output. Furthermore, the CH signal from the CH control device 21 and the ON signal from the ON control device 22 are input into the OR circuit 23, and by finding the logical sum of the two signals an OV signal is output.

The CH control device 21 generates a CH signal that is a switching signal (on/off signal) on condition of the CM1 signal being at a high level (first state). The CH signal is generated such that the ratio of on time accounted for in one period of PWM control is designated by the conduction ratio M (0<M<1). In this embodiment, the conduction ratio M can be determined for example through the following formulas.

(a) When $EFC \leq V3$, $M=0$
(b) When $EFC > V3$, $M = G \cdot (EFC - V3) = G \cdot \Delta V$.

Here, G is gain and $\Delta V = EFC - V3$ is voltage deviation.

Even though M is not limited to the above formulas, M=0 if $EFC \leq V3$, and when $EFC > V3$, the settings may be such that the conduction ratio (M) becomes greater as the voltage deviation ($\Delta V$) increases.

The error signal ERR input into the ON control device 22 is a signal generated by an unrepresented protection circuit when the control power source voltage in the drive control device 1 falls below a designated value, or when an unrepresented switching device composing the inverter circuit 5 is abnormal. When this error signal ERR is generated, there is concern that the switching device inside the inverter circuit 5 could be destroyed, so the voltage applied to the switching device (in other words, the voltage EFC impressed on the filter capacitor 9) must be quickly reduced.

The ON control device 22 generates an ON signal on condition of the CM2 signal or the ERR signal being at a high level. The ON signal is not a signal that repeats on/off with time, but is a signal that continues in an on state while the signal CM2 or the ERR signal is at a high level.

By generating an OV signal by taking the logical sum of the intermittent signal CH and the continuous signal ON in the OR circuit 23, and controlling the switching device 11 by this OV signal, the control condition of the switching device 11 has three states as shown below with respect to the detected voltage EFC.

(a) When $EFC \leq V3$, continuously open state
(b) When $V3 < EFC < V2$, intermittent control state in accordance with conduction ratio M
(c) When $EFC \geq V2$, continuously connected state Next, the composition relating to torque control of the alternating current rotating machine 13 in the power controller 14 will be explained. The CM1 signal output from the first comparator 18 is split and also used in switching a switch 24. A basic torque command PTR0, which is computed by an external control system on the basis of a command from an unrepresented driver's console and is the necessary torque for the alternating current rotating machine 13, is input to one terminal of the switch 24, and 0 (zero) is input to the other terminal. This need not be zero, but may be a value sufficiently small compared to the basic torque command PTR0 from the driver's console.

In this embodiment, the torque of the regenerative brake through the alternating current rotating machine 13 is reduced in a predetermined reduction pattern as described below, and the input value (PTR0 or zero) of this switch 24 is the target value (target torque) after reduction by this reduction pattern. Accordingly, when the CM1 signal is at a high level, the switch is selected so that the output thereof becomes zero, and through this the torque of the regenerative brake is reduced in accordance with the predetermined reduction pattern to zero from the initial torque PTR0. On the other hand, when the signal CM1 is at a low level, the switch 24 is selected so that the output thereof becomes the basic torque command PTR0, and through this the torque of the regenerative brake is kept constant at the initial torque PTR0.

The output of the switch 24 is input into a ramp processor 25. In the ramp processor 25, a ramp reduction time RMPL (>0) that is the time for reducing the torque of the regenerative brake is input, and during this ramp reduction time RMPL, the torque is reduced from PTR0, which is the initial torque, to zero, which is the target torque. For the reduction pattern at this time, the torque may be reduced linearly from the initial torque to the target torque, or the torque may be reduced along a curve such as an exponential function. In this manner, in the ramp processor 25 torque commands PTR(k) [k=1~n], which are output torque command values for the alternating current rotating machine from moment to moment, are output as a data array such that the torque is gradually reduced in accordance with the predetermined reduction pattern having a ramp reduction time RMPL longer than 0.

The data array of torque commands PTR(k) from moment to moment is input into the torque controller 26. The torque controller generates and outputs GI, which is a control signal for the switching device in the inverter circuit 5, so that the inverter circuit 5 outputs electric current and voltage such that the alternating current rotating machine 13 outputs torque matching the torque commands PTR(k) on the basis of the torque commands PTR(k) and the electric current IM of the alternating current rotating machine 13. The torque controller 26 computes the torque the alternating current rotating machine 13 outputs on the basis of the electric current IM of the alternating current rotating machine 13, and outputs the regenerative brake power signal indicating the regenerative brake force BT.

The torque commands PTR(k) are input into a comparator 27. In this comparator 27, the torque commands PTR(k) and a preset gate off level GOFL are compared, and when PTR(k)<GOFL (1<k<n), an output signal TCT is output to an OR circuit 28 as a high level. Through this, from when the torque command is reduced to PTR(k)<GOFL, the switch 29 is off and the control signal GI is off, so operation of the inverter circuit 5 stops. Here, the gate off level GOFL is normally set as a value around 10% less than the maximum value of the torque command PTR(k). The CM2 signal is also input into the OR circuit 28, so even when the CM2 signal is a high level, that is to say when the detected voltage EFC is greater than the second voltage V2, operation of the inverter circuit 5 stops due to the switch 29 being off and the control signal GI being off.

Summarizing the above, the torque control condition of the alternating current rotating machine 13 caused by the inverter circuit 5 has three states as follows with respect to the detected voltage EFC.

(a) When EFC≤V3

The control signal GI is output to the inverter circuit 5 with the torque command value at the initial torque PTR0.

(b) When V3<EFC<V2

The torque commands PTR(k) [k=1~n] are generated in accordance with the predetermined reduction pattern. The control signal GI is output to the inverter circuit 5 until PTR (k)<GOFL.

(c) When EFC≥V2

The control signal GI is turned off and the inverter circuit 5 stops.

Finally, the composition related to control of the line breaker 4 in the power controller 14 will be explained. A line breaker introduction basic command LON1 generated by the top control system for connecting direct-current power in the line breaker 4 is input into a switch 30. The switch 30 is selected based on a signal, generated by an OR circuit 31, that is the logical sum of the CM1 signal and the CM2 signal, so that when the logical sum is a high level the switch 30 is turned off and the LON signal, which is a control signal for the line breaker 4, is turned off, that is to say the line breaker is opened. In other words, when EFC (detected voltage)>V3 (third voltage), or when EFC>V2 (second voltage), the line breaker is open, but because V2>V3, when EFC>V3 the line breaker 4 is effectively open and the drive control device 1 is separated from the overhead lines 2.

The operation of the drive control device 1 for an electric train composed as described above is explained next. The explanation will be for the case in which the electric train has a regenerative break applied, that is to say when the drive control device 1 is regeneratively driving the alternating current rotating machine 13. The regenerative power from the alternating current rotating machine 13 flows from the drive control device 1 to the input side and regenerates regenerative power to the overhead lines 2.

Figure 3:
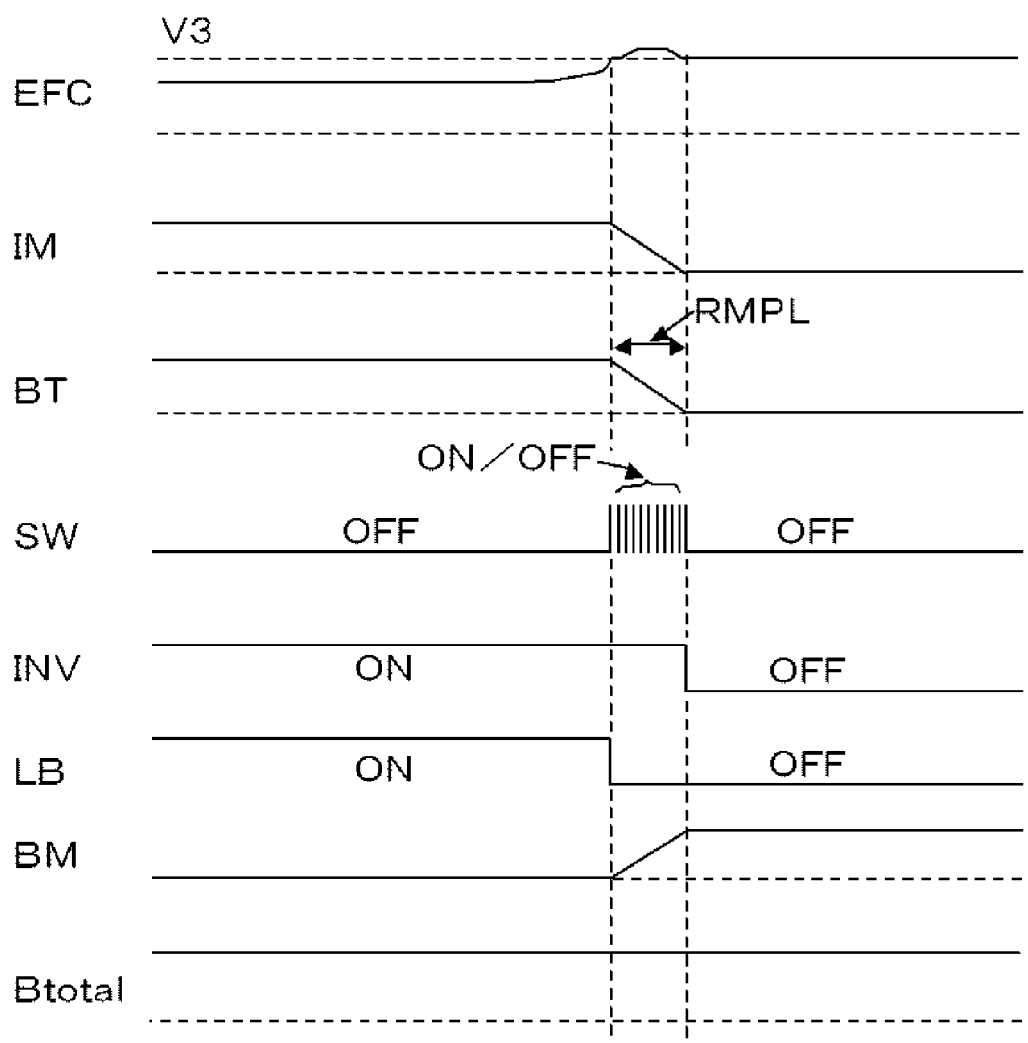
FIG. 3 shows the operation of various equipment when the detected voltage (EFC) is rising in a drive control device for an electric train according to a first embodiment of the present invention.

At this time, when a different accelerating train car present on the overhead lines 2 suspends acceleration, the regenerative power (regenerative load) consumed declines and the regenerative load is smaller than the regenerative power of the alternating current rotating machine 13, the detected voltage EFC that is the input voltage of the drive control device 1 rises. FIG. 3 shows an example of operation when the detected voltage is rising in the first embodiment of the present invention.

As shown in FIG. 3, when the detected voltage (EFC) exceeds the third voltage (V3) which is a predetermined open-circuit voltage, interruption (ON/OFF) control is performed on the switching device 11 in accordance with the conduction ratio M, with the line breaker 4 (LB) open (OFF). When the voltage deviation ΔV (=EFC−V3) is 0, the conduction ratio M is 0, and the conduction ratio M increases as ΔV increases. Thus, the bulk of the regenerative current (IM) initially output from the inverter circuit 5 (INV) charges the filter capacitor 9, and the EFC continues to increase further.

After this, as the voltage deviation ΔV becomes greater, the conduction ratio M also becomes greater, so the current flowing into the filter capacitor 9 declines, the percentage of current flowing to the discharge resistor 12 increases and in addition the regenerative current volume declines accompanying the regenerative brake power (BT) being reduced with a predetermined reduction pattern, so the bulk of the regenerative current flows to the discharge resistor 12. Following this, electric charge that has been stored is released even from the filter capacitor 9, which has achieved a relatively high voltage, so the EFC begins to decline. As the regenerative brake power and the regenerative current approach 0 in accordance with the predetermined reduction pattern, the conduction ratio M approaches 0 and EFC approaches V3.

During the time when the switching device 11 is intermittently controlled, the torque commands PTR(k) [k=1~n] of the alternating circuit rotation machine 13 are reduced to zero in accordance with the predetermined reduction pattern having a ramp reduction time longer than 0. Accompanying this, the regenerative brake power (BT) also declines. After the regenerative brake power has been narrowed down, the inverter circuit 5 (INV) is turned OFF and the conduction ratio M is 0, so the switching device 11 turns OFF and EFC is maintained at the third voltage V3.

With this embodiment, the regenerative brake power (BT) is gradually reduced in accordance with the predetermined reduction pattern, so the mechanical brake force (BM) can sufficiently follow, and phenomena such as the brake force (Btotal) of the electric train as a whole being insufficient or braking deceleration declining do not occur. Accordingly, there is no deterioration of riding comfort in the cars or lengthening of the braking distance due to fluctuations in deceleration.

Figure 4A:
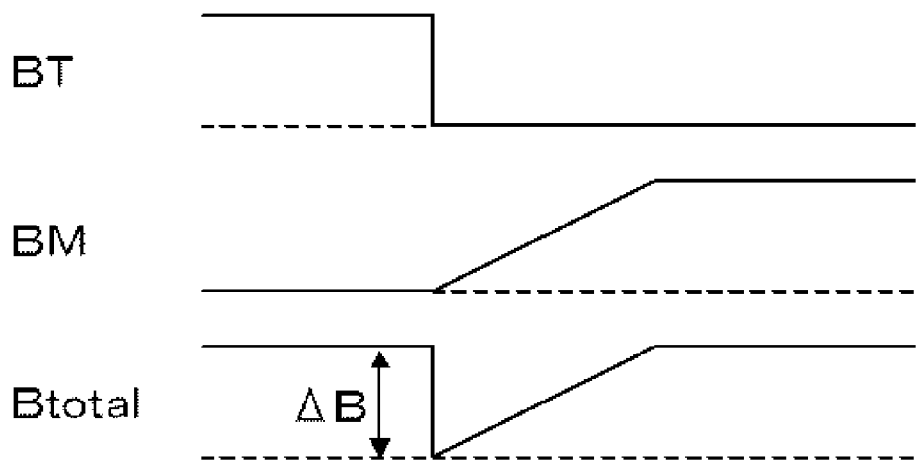
FIG. 4 shows the operation of a regenerative braking force (BT), a mechanical braking force (BM) and a total braking force (Btotal) when the ramp reduction time of the regenerative brake force(BT) is changed.
Figure 4B:
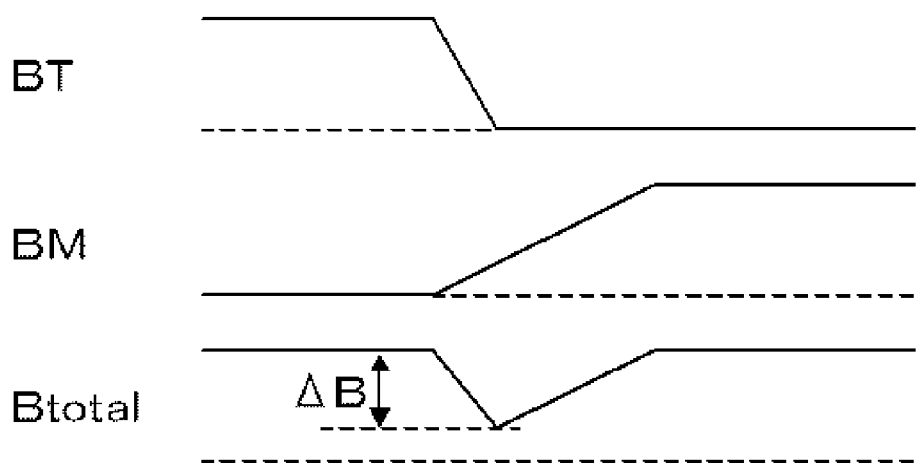
Figure 4C:
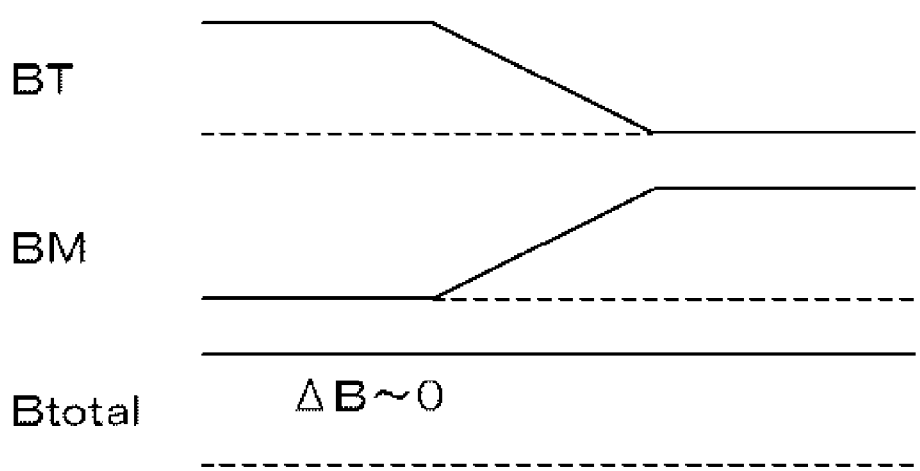
Figure 5:
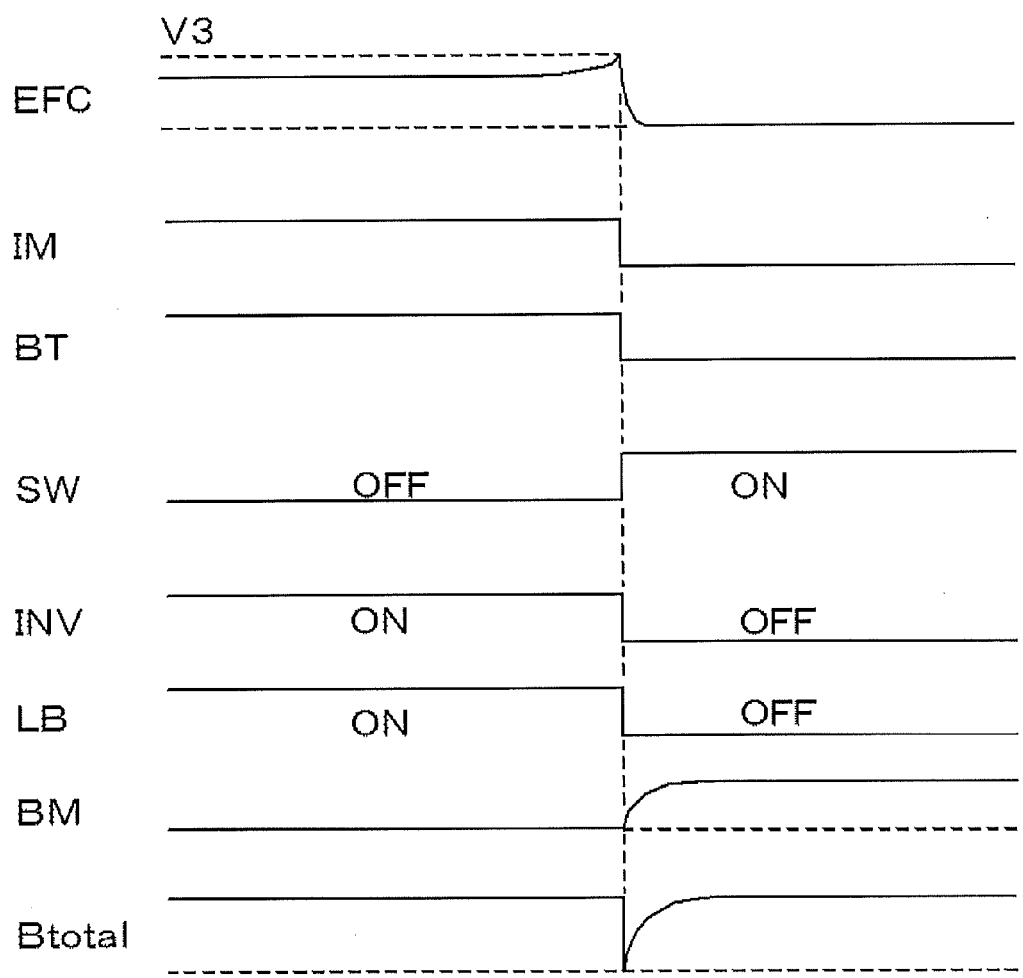
FIG. 5 shows the operation of various equipment when the detected voltage (EFC) is rising in a conventional drive control device for an electric train.

FIG. 4 shows the total brake force (Btotal) of the electric train when the ramp reduction time RMPL of the regenerative brake force (BT) is changed with respect to the time the mechanical brake force (BM) is rising to the brake command from the driver's console, that is to say the state of fluctuation (ΔB) in deceleration. Even if shorter than the time it takes the mechanical brake to rise, if the RMPL has an interval longer than 0, it is possible for the mechanical brake to rise somewhat during that interval (see FIG. 4B), so compared to the case when the regenerative brake is instantaneously lost (see FIG. 4A), it is possible to reduce fluctuation (ΔB) in the deceleration. However, when RMPL is set to a time longer than the time for the mechanical brake to start up, it becomes possible to reliably compensate for the reduction in regenerative brake with the mechanical brake, so it is possible to substantially eliminate changes in deceleration (see FIG. 4C). The response of the mechanical brake depends on the composition of the air route but is 200 milliseconds to around 2 seconds, so it is preferable to set the ramp reduction time RMPL to from 200 milliseconds to 2 seconds.

Even in cases in which the regenerative load is not lacking and the electric train stops normally, when the regenerative brake force cannot sufficiently be obtained, the composition is such that the regenerative brake is restricted in a ramp form and is supplemented by the mechanical brake, but it is preferable to use an approach in which the ramp reduction time in this case (defined as the ramp reduction time during normal times) and the ramp reduction time (RMPL) in this embodiment can be set as separate values. This is for the following reasons. Variances arise in the mechanical brake response time because the friction coefficient between the brake shoe and the wheel changes depending on temperature. In order to reduce the effects of deceleration fluctuations caused by variance in the mechanical brake response time, the normal ramp reduction time is set with an allowance taking a long-term view.

On the other hand, to lengthen the RMPL in this embodiment, the capacity of the discharge resistor 12 must be made larger because electricity passes intermittently to the discharge resistor 12 over this interval. Because there are limitations to the capacity of the discharge resistor 12 due to restrictions on installation space, the RMPL in this embodiment is set shorter than the normal lamp reduction time, so it is preferable to use an approach in which the normal lamp reduction time and the RMPL in this embodiment can be set as separate values. When the RMPL is set from 200 milliseconds to 2 seconds as described above, the regenerative power amount is small and the capacity of the discharge resistor 12 does not become large compared to conventional devices.

As described above, when the detected voltage EFC exceeds the third voltage V3, the conduction ratio (M) becomes greater as the voltage deviation ΔV (EFC−V3) increases, so when the charge amount of the filter capacitor 9 becomes excessive, it is possible for the regenerative current to flow to the discharge resistor 12 side via the switching device 11. Accordingly, the detected voltage EFC never exceeds the second voltage V2, so voltage moderately exceeding V3 should be enough. With a drive control device for an electric train according to this embodiment, even when the regenerative load is lacking during the regenerative braking action, control can be accomplished so that the detected voltage EFC does not reach the second voltage, so phenomena such as the braking force of the electric train as a whole being insufficient or the braking deceleration dropping do not arise. Accordingly, problems such as lengthening of braking distance or deterioration of riding comfort in the cars due to fluctuations in deceleration do not occur.

However, when the detected voltage EFC again rises further due to some factor and exceeds the second voltage V2, or when an error signal ERR is generated (when the control power source voltage in the drive control device 1 drops more than a specified value or an unrepresented switching device comprising the inverter circuit 5 is abnormal), there is concern that the switching device inside the inverter circuit 5 could be destroyed, so the voltage EFC impressed on the inverter circuit 5 must be quickly reduced.

With a drive control device 1 for an electric train according to this embodiment as described above, the power controller 14 controls the inverter circuit 5 which is a power converter so that when the detected voltage EFC of the voltage detector 15 exceeds a predetermined open-circuit voltage V3, the regenerative brake force BT is reduced by the alternating current rotating machine 13 through a predetermined reduction pattern having a ramp reduction time RMPL longer than 0, so in this reduction time, it is possible for the brake force BM through the mechanical brake to increase, and thus even when the regenerative load is lacking during the regenerative braking action, it is possible to reduce fluctuations ΔB in the deceleration of the electric train and to improve riding comfort.

In addition, with the drive control device 1 for an electric train according to this embodiment, the filter capacitor 9 connected to the two terminals on the input side of the inverter circuit 5 and the capacitor voltage regulator 10 connected between the two terminals in parallel with the filter capacitor 9 and having a switching device 11 are provided, and the power controller 14 regulates the charge amount on the filter capacitor 9 by intermittently controlling the switching device 11 so that the detected voltage EFC is not less than the first voltage V1 and not greater than the second voltage V2 over the ramp reduction time RMPL, and consequently, the inverter circuit 5 is caused to operate even during the ramp reduction time RMPL during which the drive control device 1 is cut off from the overhead lines 2, and through this it is possible to convert the current of the alternating current rotating machine 13 to direct current via the inverter circuit 5 and consume such, making it possible to cause the regenerative brake to operate stably across this ramp reduction time RMPL.

In this embodiment, the parallel circuit of the filter capacitor 9 and the capacitor voltage regulator 10 is connected to the input unit of the inverter circuit 5, and through this an example was illustrated of a circuit composition in which the input voltage of the inverter circuit 5 can be controlled to not less than the first voltage V1 and not greater than second voltage V2, but by using the regenerative current output from the inverter circuit 5, if this is a circuit in which the input voltage of the inverter circuit 5 can be controlled to not less than V1 and not greater than V2, needless to say a similar effect can be achieved even with a different format using a storage battery and/or the like, for example.

Furthermore, with the drive control device 1 for an electric train according to this embodiment, when the voltage deviation ΔV, found by subtracting from the detected voltage EFC the third voltage V3 that is greater than the first voltage V1 and less than the second voltage V2, is 0 or negative, the power controller 14 makes the conduction ratio M of the switching device 11 be 0, and when the voltage deviation ΔV is positive, executes control so that the conduction ratio M becomes greater as the voltage deviation becomes larger, and consequently it is possible for regenerative current to flow to the discharge resistor 12 side via the switching device 11 when the charge amount on the filter capacitor 9 has become excessive, making it possible to stably operate the inverter circuit 5 without the detected voltage EFC surpassing the second voltage V2. Furthermore, the filter capacitor 9 can retain the charge accumulated to V3 without the electric charge stored in the filter capacitor 9 being discharged until the EFC is not greater than V3, and consequently it is possible to limit the electric current flowing to the discharge resistor 12 and it is possible to use a discharge resistor 12 with a small capacity.

With the drive control device 1 for an electric train according to this embodiment, the power controller 14 controls the conduction ratio M to become 1 when the detected voltage EFC is not less than the second voltage V2, or controls the conduction ratio to become 1 when the control power source voltage in the drive control device 1 drops below a stipulated value or when the switching device comprising the inverter circuit 5 is abnormal, and consequently there are no fears that the switching device in the inverter circuit 5 will be destroyed, so it is possible to provide a highly reliable drive control device 1.

With the drive control device 1 for an electric train according to this embodiment, when the brake power command BREF and the regenerative brake power signal indicating the output status of the alternating current rotating machine 13 are input and the regenerative brake force BT is lacking relative to the brake power command BREF, a brake controller 16 is provided to control the mechanical brake force BM so as to supplement this lacking amount, and consequently it is possible to curtail insufficient brake force in the electric train as a whole and drops in braking deceleration. In addition, a characteristic of the power controller 14 is that the ramp reduction time RMPL is longer than the time needed for the mechanical brake force BM to increase as far as the brake command BREF, and consequently it is possible to supplement with certainty the amount by which regenerative braking has declined, using the mechanical brake, so it is possible to substantially eliminate changes in deceleration.

Second Embodiment

The drive control device for an electric train according to this embodiment uses a storage battery in place of the discharge resistor 12 in the capacitor voltage regulator 10. The composition and operation of devices other than this are the same as in the first embodiment, so description of such is omitted here. With the drive control device for an electric train according to this embodiment, in addition to the effect achieved by the drive control device 1 of the first embodiment, when the regenerative load is lacking during operation of the regenerative brake, the storage battery is charged by the regenerative current, and this power that charges the storage battery can be used when the electric train is driven with strenuous effort, resulting in the effect that it is possible to increase the energy usage efficiency when operating the electric train.

The composition illustrated in the above embodiments shows one example of the content of the present invention, and it is possible to combine such with other commonly known art, to apply such to an electric train using a direct current rotating machine or to comprise such with variations such as omitting some parts without deviating from the scope of the present invention.

DESCRIPTION OF SYMBOLS 1 drive control device
4 line breaker (switch)
5 inverter circuit (power converter)
9 filter capacitor
10 capacitor voltage regulator
11 switching device
12 discharge resistor
13 alternating current rotating machine
14 power controller
15 voltage detector
16 brake controller
17 voltage determiner
18 first comparator
19 second comparator
20 switching device control signal generator
21 CH control device
22 ON control device
23 OR circuit
24 switch
25 ramp processor
26 torque controller

The invention claimed is:

1. A drive control device for an electric train, comprising:
a switch for connecting or opening direct-current electric power;
a power converter into which the direct-current electric power is input via the switch between two terminals on an input side, for converting the direct-current electric power into alternating-current electric power through a switching operation, and driving an alternating-current rotating machine connected to an output side;
a voltage detector for detecting voltage between the two terminals;
a power controller for controlling the power converter such that when the voltage detected by the voltage detector exceeds a predetermined open-circuit voltage, the switch opens and regenerative brake power is reduced by the alternating-current rotating machine in a predetermined reduction pattern having a ramp reduction time longer than zero;
a filter capacitor connected between the two terminals; and
a capacitor voltage regulator connected between the two terminals in parallel with the filter capacitor and having a switching device;
wherein the power controller intermittently controls the switching device and regulates a charge amount in the filter capacitor so that the detected voltage is not less than a first voltage and not greater than a second voltage over the ramp reduction time, and
wherein the power controller sets a conduction ratio of the switching device to be zero at the timing when a voltage deviation reaches zero or a negative value from a positive value, and the power controller starts controlling in such a manner that as the voltage deviation increases, the conduction ratio increases at the timing when the voltage deviation reaches a positive value from zero or a negative value, the voltage deviation being determined by subtracting a third voltage from the detected voltage, wherein the third voltage is greater than the first voltage and less than the second voltage.

2. The drive control device for an electric train according to claim 1, wherein the power controller is such that the first voltage is an operating lower limit voltage of the power converter, and the second voltage is a maximum used voltage of the power converter.

3. The drive control device for an electric train according to claim 1, wherein the power controller sets the conduction ratio to be one when the detected voltage is equal to or greater than the second voltage.

4. The drive control device for an electric train according to claim 1, wherein the power controller sets the conduction ratio to be one when a control power source voltage in the drive control device drops below a prescribed value, or when a switching device comprising the power converter is determined to be abnormal.

5. The drive control device for an electric train according to claim 1, wherein:
the power controller is configured to:
control the power converter so that a torque output from the alternating current rotating machine maintains an initial torque commanded from a driver's console when the detected voltage is equal to or less than the third voltage;
control the power converter so that the torque output from the alternating current rotating machine is reduced from the initial torque in accordance with a predetermined reduction pattern when the detected voltage is greater than the third voltage and less than the second voltage; and
stop the power converter when the detected voltage is equal to or greater than the second voltage.

6. The drive control device for an electric train according to claim 1, wherein the capacitor voltage regulator has a series structure of the switching device and a discharge resistor.

7. The drive control device for an electric train according to claim 1, wherein the capacitor voltage regulator has a series structure of the switching device and a storage battery.

8. The drive control device for an electric train according to claim 1, further comprising a brake controller that, when a regenerative brake force signal indicating the output state of the alternating current rotating machine and a brake force command are input and the regenerative brake force signal is lacking relative to the brake force command, controls a mechanical brake force to supplement this lacking amount.

9. The drive control device for an electric train according to claim 3, wherein the power controller comprises:
- a voltage determiner having a first comparator for generating a first signal (CM1) that is a first state when the detected voltage is equal to or greater than the third voltage, and a second comparator for generating a second signal (CM2) that is a second state when the detected voltage is equal to or greater than the second voltage; and
- a switching device control signal generator having a first control device for generating an intermittent signal (CH) that opens in accordance with the conduction ratio when the first signal (CM1) is in the first state, a second control device for generating an on-signal (ON) when the second signal (CM2) is in the second state, and a circuit for generating a logical sum signal of the intermittent signal (CH) and the on-signal (ON);
- wherein the power controller controls the switching device through the logical sum signal.

10. The drive control device for an electric train according to claim 5, wherein the power controller comprises:
- a switch with which selection of a target torque is accomplished in accordance with the detected voltage;
- a ramp processor into which the ramp reduction time is input and which generates a torque command for reducing from the initial torque to the target torque in accordance with the predetermined reduction pattern; and
- a torque controller into which an electric current (IM) of the alternating current rotating machine is input and which generates a control signal for the power converter such that the alternating current rotating machine outputs a torque matching the torque command, on the basis of this electric current (IM);
- wherein the power controller controls the power converter through the control signal.

11. A drive control device for an electric train, comprising:
- a switch for connecting or opening direct-current electric power;
- a power converter into which the direct-current electric power is input via the switch between two terminals on an input side, for converting the direct-current electric power into alternating-current electric power through a switching operation, and driving an alternating-current rotating machine connected to an output side;
- a voltage detector for detecting voltage between the two terminals;
- a power controller for controlling the power converter such that when the voltage detected by the voltage detector exceeds a predetermined open-circuit voltage, the switch opens and regenerative brake power is reduced by the alternating-current rotating machine in a predetermined reduction pattern having a ramp reduction time longer than zero;
- a filter capacitor connected between the two terminals;
- a capacitor voltage regulator connected between the two terminals in parallel with the filter capacitor and having a switching device; and
- a brake controller that, when a regenerative brake force signal indicating the output state of the alternating current rotating machine and a brake force command are input and the regenerative brake force signal is lacking relative to the brake force command, controls a mechanical brake force to supplement this lacking amount;
- wherein the power controller intermittently controls the switching device and regulates a charge amount in the filter capacitor so that the detected voltage is not less than a first voltage and not greater than a second voltage over the ramp reduction time, and
- wherein the power controller is such that the ramp reduction time is input that is longer than the time needed for the mechanical brake force to rise to the value of the brake command.

12. The drive control device for an electric train according to claim 11, wherein the power controller is such that the ramp reduction time of not less than 200 milliseconds and not more than 2 seconds is input.

* * * * *